United States Patent [19]

Dennert

[11] Patent Number: 5,046,596
[45] Date of Patent: Sep. 10, 1991

[54] METHODS AND APPARATUS FOR CONTROLLING THE FRICTIONAL ENGAGEMENT BETWEEN A HUB AND A SHAFT AT A POWER TRANSMISSION INTERFACE

[75] Inventor: R. Bruce Dennert, Waukesha, Wis.

[73] Assignee: Harley-Davidson, Inc., Milwaukee, Wis.

[21] Appl. No.: 499,905

[22] Filed: Mar. 27, 1990

[51] Int. Cl.⁵ .............................................. F16D 3/14
[52] U.S. Cl. ................................ 192/106.1; 192/30 V
[58] Field of Search .......................... 192/30 V, 100.1; 464/160, 180, 182

[56] References Cited

U.S. PATENT DOCUMENTS 2,016,154 10/1935 McWhirter ............................ 464/96
4,501,348 2/1985 Lutz et al. ........................ 192/106.1

FOREIGN PATENT DOCUMENTS 52-3953 1/1977 Japan ..................................... 464/96

Primary Examiner—Allan D. Herrmann
Assistant Examiner—Nicholas Whitelaw
Attorney, Agent, or Firm—Foley & Lardner

[57] ABSTRACT

Method and apparatus for damping the effects of cyclic engine speed variations on the splines of a driving hub and the mating splines of a shaft driven by the hub. A caliper-like retaining mechanism includes a retaining nut threadedly engaging the distal end of the shaft, which distal end is journaled through a splined bore of the driving hub. A shoulder washer is disposed about the shaft proximate the hub shoulder, which shoulder washer is secured to the shaft by the retaining nut. A disc spring urges the shoulder washer into frictional engagement with the hub, which disc spring is retained in a circular groove within the hub. A predetermined preload is exerted by the disc spring on the shoulder washer, which preload is sufficient to overcome the forces which tend to induce rattle between the splines of the shaft and the corresponding splines of the hub.

20 Claims, 3 Drawing Sheets

METHODS AND APPARATUS FOR CONTROLLING THE FRICTIONAL ENGAGEMENT BETWEEN A HUB AND A SHAFT AT A POWER TRANSMISSION INTERFACE

TECHNICAL FIELD

The present invention relates, generally, to methods and apparatus for controlling the relative angular movement between a clutch hub and a shaft intermittently driven thereby, and more particularly, to a retaining apparatus for applying a controlled resistance to relative angular motion between a shaft and a hub through the application of a controlled amount of friction therebetween.

BACKGROUND OF THE INVENTION

1. Background and Technical Problems

Mechanical drive trains in which a transmission and clutch assembly cooperate to transmit engine torque to a vehicle drive shaft are generally well known. For example, transmission systems in motorcycles typically include an engine having an output crankshaft which cooperates with a clutch mechanism for selectively applying torque to a transmission input shaft in accordance with the position of the clutch. When the clutch is engaged, the crankshaft drives a clutch hub which, in turn, drives the transmission input shaft. The transmission converts input torque from the transmission input shaft into output torque at a transmission output shaft in accordance with one of a plurality of gears housed within the transmission. The amount of torque ultimately transmitted to the vehicle wheel sprocket depends, inter alia, on the particular gear selected.

When the clutch is disengaged, the power transmission circuit is temporarily interrupted so that no torque is applied to the transmission input shaft. This allows the transmission to change from one gear to another, whereupon the clutch may be re-engaged to again complete the power transmission circuit.

The transmission input shaft is circumscribed by the clutch hub intermediate the engine and transmission. Various configurations have been employed to insure that the hub and shaft maintain driving engagement with respect to each other while minimizing power losses during torque transmission. For example, certain systems employ a keyway in the inner diameter of the hub, there being an interlocking "key" extending from the outer diameter of the shaft into the keyway. Alternatively, a tapered shaft, having a conical or frustoconical portion frictionally engaging a similarly shaped hub portion has been employed, whereby the shaft is loaded axially into the hub to maintain driving engagement between the respective mating tapered surfaces.

The most common shaft/hub interface comprises a plurality of equally spaced splines disposed about the outer diameter of the shaft near an end thereof, and corresponding mating splines disposed about the inner diameter of the hub for driving engagement with the shaft splines. The splines are advantageously disposed along a series of straight lines parallel to the common axis of the shaft and hub.

Design tolerances associated with the splines facilitate assembly of the system and enhance the interchangeability of the respective parts. Consequently, a small amount of clearance is built into the spline interface, such that a limited amount of angular motion is permitted between the shaft and hub despite the splined engagement therebetween.

For example, if the hub is held stationary and the shaft is positioned therewithin such that the nominal peak center of each shaft spline is aligned with the nominal valley center of each spline, the shaft may be rotated by a small amount $\theta_1$ in a first direction or, alternatively, by a small amount $\theta_2$ in the opposite direction, until the splines contact each other. Thus, a total nominal angular clearance of $\theta_T = \theta_1 + \theta_2$ is designed into each shaft/hub assembly. Of course, the actual amount of angular clearance associated with a particular assembly may be somewhat greater or less than $\theta_T$.

In order to transmit torque to the vehicle wheel sprocket, the clutch must be engaged to permit engine torque to be applied to the transmission via the transmission input shaft. In addition, one of the gears must be selected to permit torque to be transmitted from the transmission input shaft to the transmission output shaft. The transmission output shaft transmits torque to the vehicle wheel, either directly or, for example, through a chain or belt to a sprocket mounted on the wheel. When the clutch is engaged, the angular clearance is taken up as the hub splines are loaded against the shaft splines, and the hub and shaft rotate together.

When the transmission is in neutral, on the other hand, no torque is transmitted from the transmission input shaft to the transmission output shaft. Thus, the end of the transmission input shaft remote from the clutch hub is essentially unconstrained. When the clutch is also disengaged, both ends of the transmission input shaft are unconstrained. In this condition, the shaft splines typically are not angularly loaded against the hub splines except, perhaps, for loading due to gravity or due to "winding down" upon being shifted from one of the gears into neutral. In any case, revolutions (rpms) of the crankshaft are not transmitted to the hub/shaft splined interface.

In contrast, engine rpms are transmitted to the hub/shaft interface when the clutch is engaged. As stated above, engine torque is transmitted to the vehicle wheel when the vehicle is in gear. However, when the clutch is engaged but the transmission is in neutral (the vehicle is idling), engine rpms are transmitted to the transmission input shaft yet no torque is transmitted thereby because the end of the shaft opposite the clutch is unconstrained. As a result, the design clearance $\theta_T$ associated with the hub/shaft splined interface permits a limited degree of relative angular movement between the shaft and the hub, giving rise to the possibility of "rattle" observed in some motorcycles at idle. Over time this relative angular motion can result in an increase in the angular clearance $\theta_T$ through the phenomenon of fretting corrosion, i.e., corrosion produced by the relative motion at the hub/shaft interface due to either too little control or too much control.

Early attempts to control this relative angular movement involved the use of a circular clip disposed about the end of the shaft extending through the hub. The clip was seated within a circular groove disposed about the shaft and had a flat bearing surface configured to contact an oppositely disposed bearing surface on the hub. Alternatively, a washer was disposed about the shaft between the clip and the hub. Properly dimensioned, this system was capable of transmitting a retaining load to the shaft, which load was transmitted to the bearing surface at the clip/hub (or washer/hub) interface, thereby reducing the degree of relative motion between the shaft and the hub. However, due to the cumulative effect of dimensional variations (tolerance "stack-up") in the various components, it has proven difficult to control the amount of friction at the clip/hub (or washer/hub) interface.

Further attempts have involved the introduction of a nut threadedly engaging the distal end of the shaft. The nut and hub are provided with cooperating bearing surfaces to limit the relative angular motion between the shaft and hub in much the same way as the above-mentioned clip, with the advantage that the amount of bearing force could be adjusted as a function of the seating torque applied to the nut. However, it has been observed that the ability of the nut to control relative angular motion decreases over time. Moreover, due to the stiffness of the mechanical circuit, it has proven difficult to control the amount of friction at the nut/hub interface.

Accordingly, a mechanism is needed for controllably applying a predetermined frictional force to the shaft to thereby control the extent of relative angular motion between the shaft and hub to within desired limits, and which mechanism remains effective over time.

2. Summary of the Problem

The present inventor has determined that presently known mechanisms for controlling the relative angular motion between the shaft and hub which employ a nut secured to the distal end of the shaft are susceptible to cyclic acceleration reversals which tend to decrease the frictional "control" force over time. Due to the inherent stiffness of the retaining system, small changes in seating torque have a pronounced effect on the amount of friction available for controlling relative angular motion between the shaft and the hub. In addition, consistent control of the frictional forces between the hub and shaft is particularly problematic because of the cumulative effects of piece-part dimensional variations.

3. Summary of the Solution

In accordance with one aspect of the present invention, methods and apparatus are provided for damping the effects of cyclic engine speed variations, thereby enhancing control of the relative angular motion between the splines of a driving hub and the mating splines of a shaft driven by the hub while the vehicle is at idle.

A particularly advantageous feature of the present invention provides a caliper-like retaining mechanism for applying a predetermined resistance to relative motion between the shaft and hub, which resistance is selected to be sufficient to adequately inhibit fretting corrosion. In addition, the caliper mechanism interrupts the stiff mechanical circuit comprising the hub shoulder and retaining nut shoulder, allowing the control system of the present invention to remain effective over time.

A specific implementation of the present invention provides a retaining nut threadedly engaged to the distal end of a driven shaft, which distal end is journalled through a splined bore of a driving hub. In prior art systems, the nut is configured to abut an annular shoulder disposed on the face of the hub in a plane transverse (i.e., not parallel) to the common axis of the shaft and hub. The present system, in contrast, provides a shoulder washer disposed about the shaft proximate the hub shoulder, which shoulder washer is secured to the shaft by the retaining nut. A disc spring is provided for urging the shoulder washer into frictional engagement with the hub, the disc spring being retained by a snap ring advantageously seated in a circular groove within the hub. An important feature of the disc spring is that it exhibits an essentially constant spring force over a predetermined range of compression. Consequently, small changes in disc spring compression do not appreciably affect disc spring preload, resulting in enhanced frictional control.

The relative sizes and disposition of the respective elements, in conjunction with the configuration of the disc spring, yields a predetermined preload exerted by the disc spring on the shoulder washer, which preload is sufficient to overcome the forces which tend to induce rattle between the splines of the shaft and the corresponding splines of the hub. At the same time, the washer, spring, and clip interrupt the mechanical circuit which could otherwise influence the initial seating torque on the nut as the nut/hub interface is subjected to acceleration reversals during vehicle operation.

DETAILED DESCRIPTION OF PREFERRED EXEMPLARY EMBODIMENTS

Figure 1:
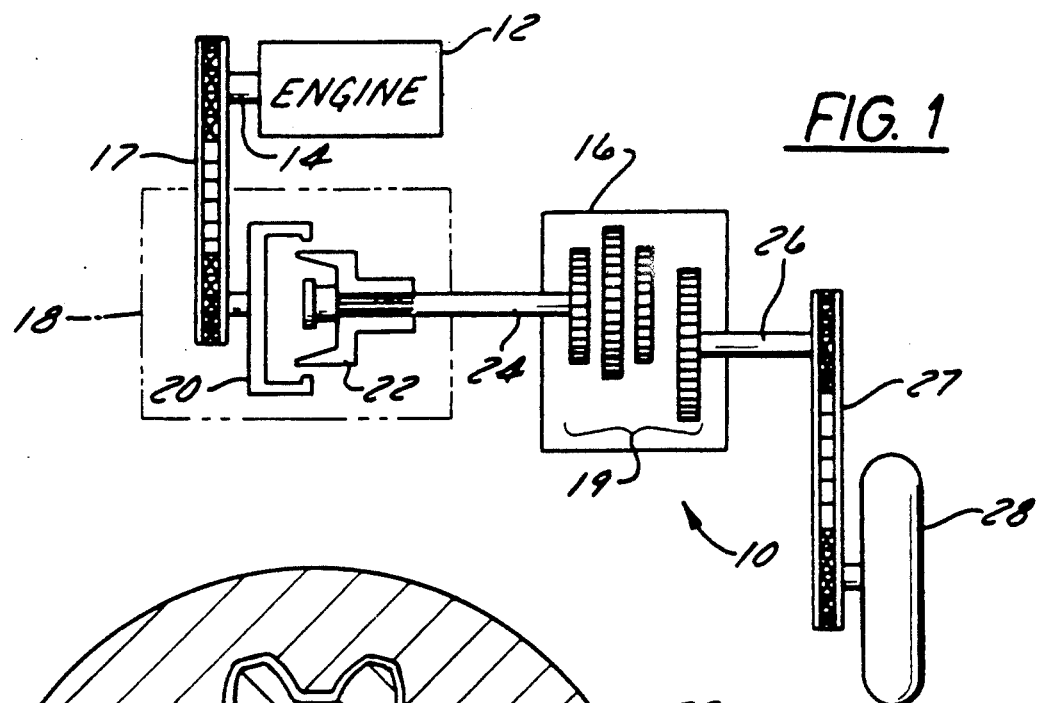
FIG. 1 is a schematic representation of an exemplary power transmission system including an engine, clutch mechanism, transmission, vehicle drive shaft, and wheel.

Referring now to FIG. 1, an exemplary power transmission system 10 in accordance with the present invention suitably includes an engine 12, for example a conventional motorcycle piston engine, an engine output shaft (crankshaft) 14, and a first chain 17 for transmitting torque from shaft 14 to a clutch mechanism 18 including a clutch disc 20 and a clutch hub 22. Clutch 18 may be any suitable mechanism for effecting intermittent coupling of disc 20 to hub 22, for example a disc clutch, cone clutch, hydraulic clutch, or the like.

Clutch 18 cooperates with a transmission input shaft 24 for transmitting torque to a transmission 16 including a plurality of gears 19. A transmission output shaft 26, which may be coaxial with shaft 24, is configured to transmit torque from transmission 16 to vehicle wheel 28 through a chain or belt 27.

Each of respective gears 19 is configured to selectively transmit torque from input shaft 24 to output shaft 26 in accordance with the power requirements of the vehicle. Clutch mechanism 18 facilitates the engagement of and transition between respective gears 19. When it is desirable to change from one gear to another, whether from a higher to a lower torque condition or vice versa, transmission system 10 undergoes a relatively brief dwell period during which none of the gears are engaged. This transient neutral mode of operation is relatively inconsequential in relation to the dynamic engagement between shaft 24 and hub 22, inasmuch as hub 22 typically disengages from disc 20 during the shifting operation.

The relevant neutral mode for present purposes occurs when none of the gears 19 are engaged and clutch mechanism 18 is engaged, i.e., when disc 20 is dynamically coupled to hub 22. System 10 is then said to be in the idle mode or, alternatively, the vehicle is said to be idling.

During idle, the revolution of crankshaft 14 is transmitted through chain 17 and disc 20 to hub 22. In accordance with a preferred embodiment, hub 22 is splinedly engaged to transmission input shaft 24 such that hub 22 drives shaft 24 as long as clutch 18 is engaged. A principal feature of the present invention surrounds the dynamic interaction at the spline interface of hub 22 and shaft 24 and the mechanism by which cyclic engine speed variations are transmitted to this interface.

Figure 2:
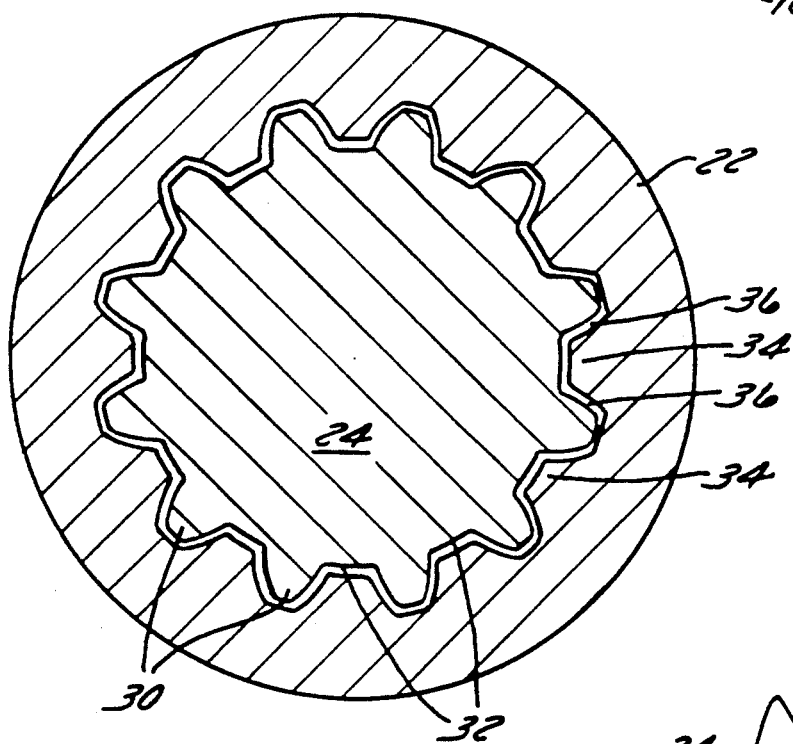
FIG. 2 is a schematic representation of a sectional view of the splined interface between an exemplary drive shaft and hub.
Figure 3:
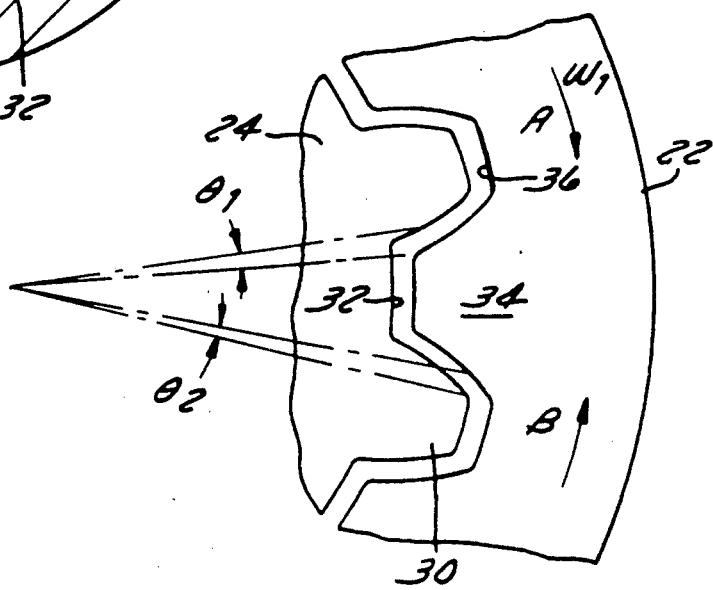
FIG. 3 is an enlarged view of a portion of the splines shown in FIG. 2.

Referring to FIGS. 2-4, the outer diameter of shaft 24 illustratively comprises a plurality of spaced apart, circumferentially disposed splines 30 separated by respective valleys 32. Similarly, a plurality of splines 34, separated by valleys 36, are disposed about the inner diameter of a bore extending through hub 22. Although the splines are schematically represented in cross section as extending parallel to the longitudinal axis of shaft 24, it is understood that the present invention may be employed in conjunction with any suitable interface mechanism, for example, helical splines, mating gears, a keyway configuration, or a tapered or frustoconical shaft cooperating with a similarly shaped hub and the like.

It is evident from FIGS. 2 and 3 that hub 22 is mechanically constrained to rotate with shaft 24, except that a small amount of angular shift, corresponding to the clearance provided between splines due to built-in design tolerances, is permitted. Moreover, a limited degree of motion along a line transverse to the shaft axis exists as a result of the aforementioned radial clearance.

As best seen in FIG. 3, respective shaft splines 30 illustratively assume a nominal relative position with respect to hub splines 34 when shaft 24 is centered within hub 22. Viewing FIG. 3 from an inertial frame of reference wherein shaft 24 is deemed to be fixed, clockwise rotation of hub 22 along arrow A would produce a nominal relative angular displacement $\theta_2$ between shaft 24 and hub 22. Analogously, counterclockwise rotation of hub 22 along the direction of arrow B would produce a nominal angular shift $\theta_1$ between shaft 24 and hub 22. For parts made in accordance with accepted engineering practices and which are within a predetermined range of dimensional tolerance, $\theta_1$ is approximately equal to $\theta_2$, so that a total relative angular shift $\theta_T = \theta_1 + \theta_2$ results.

$\theta_T$ represents the maximum allowable angular displacement of shaft 24 relative to hub 22 during relative angular motion therebetween. As the frequency of the angular motion increases with increased engine speed, the change in angular momentum of the respective elements (shaft and hub) with respect to time increases, thereby increasing the force associated with the transient contact between the hub splines and shaft splines (force being the time derivative of momentum).

Figure 5:
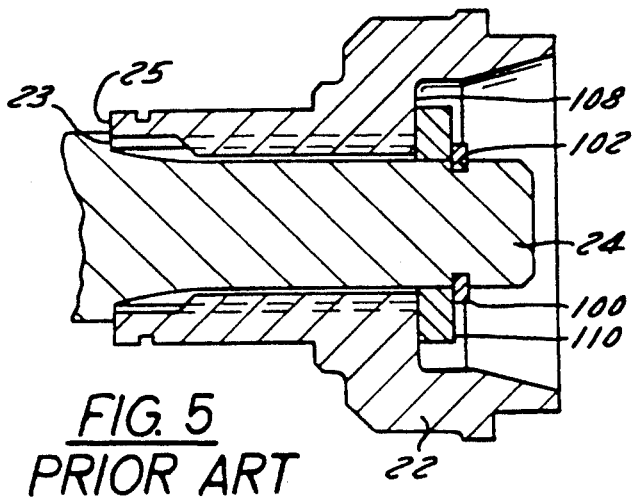
FIG. 5 is a cross-section view of a shaft splinedly engaged with a hub, the shaft being secured within the hub by a circular retaining clip and washer.

In early transmission systems, little was done to control this relative angular motion between the shaft and hub inasmuch as the effect on vehicle performance was relatively slight. For example, FIG. 5 illustrates hub 22 retained about shaft 24 by a retaining clip 100 mounted in a circular slot 102 in shaft 24. Often a spacer 110 was inserted between clip 100 and hub 22 to prevent retaining clip 100 from damaging the hub face. More particularly, spacer 110 abuts a shoulder 108 of hub 22, and a shoulder 25 of hub 22 abuts a shoulder 23 of shaft 24.

Figure 6:
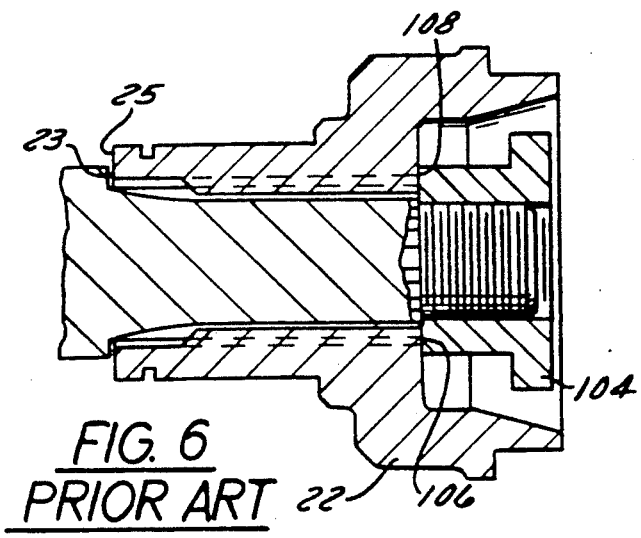
FIG. 6 is a cross-section view of a shaft retained within a hub by a retaining nut.

Turning now to FIG. 6, the most common approach to controlling shaft/hub relative angular motion involves the use of a retaining nut 104 threadedly engaged to the distal end of shaft 24. Hub 22 may thus be "pinched" between nut 104 and shoulder 23 of shaft 24 in a caliper-like manner. The extent to which nut 104 is tightened onto shaft 24 in large measure determines the magnitude of the resistance to relative motion between shaft 24 and hub 22.

With continued reference to FIG. 6, nut 104 includes an annular shoulder 106 which abuts an oppositely disposed annular shoulder 108 on a surface of hub 22. The coefficient of static friction between respective shoulders 106 and 108 (and between shaft shoulder 23 and hub shoulder 25), in conjunction with the normal force produced at the shoulder interface by the seating torque applied to nut 104 during assembly, inhibits relative angular motion between shaft 24 and hub 22. As a result, rattle is inhibited to the extent nut 104 engages shaft 24 with sufficient torque to overcome the angular accelerations induced in the shaft.

The present inventor has determined that cyclic engine speed variations play a critical role in the control of relative angular motion between the shaft and hub rattling phenomenon. The present inventor has further determined that more substantial torque variations, of the type associated with vehicle accelerations and decelerations, can overcome the frictional resistance to relative angular motion provided by nut 104, thereby reducing the effectiveness of the configuration in FIG. 6 over time.

During steady state operation of engine 12, i.e., during idle, various factors influence the instantaneous rate at which crankshaft 14 rotates. These factors may include, for example, the point in the piston stroke at which a spark is initiated within the cylinder, instantaneous cylinder volume, the relative quantities of air and gasoline in the cylinder, the timing of the spark in one cylinder vis-a-vis other cylinders, and the position and integrity of the bearing through which shaft 14 is journaled. Other factors may amplify these speed variations, such as the instantaneous tension in chain 17, the integrity and instantaneous mechanical resistance at the junction between shaft 14 and chain 17 and the junction between chain 17 and disc 20, and nonuniformly distributed mass in all of the rotating parts, for example.

As a result, the instantaneous rate of revolution of hub 22 varies over time. For example, although an analog tachometer may indicate a steady state engine speed of 1000 rpm, the instantaneous rate may actually vary between 975 and 1025 rpm. Accordingly, hub 22 experiences intermittant, high frequency angular accelerations and decelerations with respect to shaft 24 during idle.

Figure 4A:
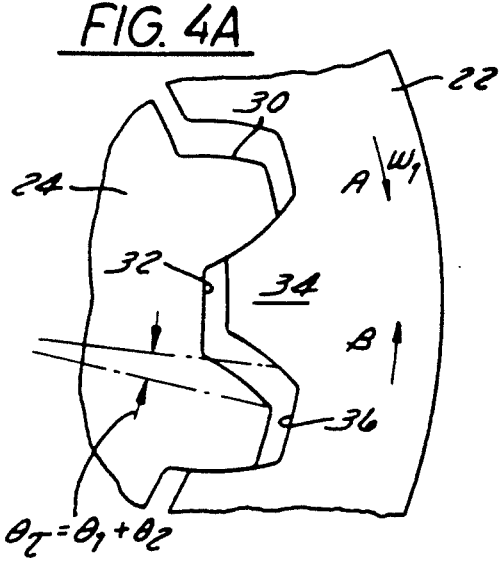
FIG. 4A represents the spline interface of FIG. 3 wherein the hub is rotated counter-clockwise with respect to the shaft.
Figure 4B:
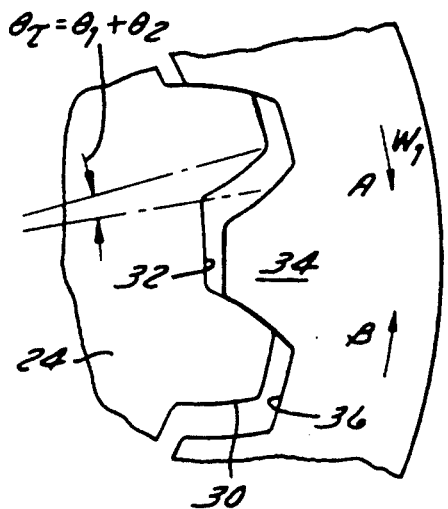
FIG. 4B represents the spline interface of FIG. 3 and 4A wherein the hub is rotated clockwise with respect to the shaft.

With particular reference to FIGS. 3 and 4, hub 22 traverses an arc $\theta_T$ in response to these cyclic engine accelerations and decelerations. Specifically, when hub 22 is driving shaft 24 in the clockwise direction (arrow A) at an instantaneous angular velocity $W_1$ as shown in FIG. 4B, respective hub splines 34 drive respective shaft splines 30 at an exemplary angular frequency of $W_1$. Recall that in the neutral mode, the end of shaft 24 remote from hub 22 is essentially unconstrained within transmission 16. Thus, when hub 22 decelerates to $W_2$ (i.e., $W_2 < W_1$), shaft splines 30, which are rigidly affixed to unconstrained shaft 24, maintain an angular velocity approximately equal to $W_1$ for a brief period. Shaft splines 30 continue to rotate in the A direction at a greater angular velocity than hub splines 34 until shaft splines 30 traverse an arc defined by $\theta_T$, at which time splines 30 collide with splines 34, as shown in FIG. 4A.

Shortly thereafter, the components again assume the configuration shown in FIG. 4B, in part because of a recoil effect which urges splines 30 in the direction of arrow B upon impact with splines 34, and in part because of internal frictional forces which tend to impede the rotation of shaft 24. In any event, a second collision between hub splines 34 and shaft splines 30 occurs as hub 22 resumes driving engagement with shaft 24 at $W_2$. This entire process occurs in a fraction of a second and is repeated each time hub 22 undergoes an appreciable speed change. These intermittent collisions at the shaft/hub spline interface, induced by engine speed variations, occur on the order of 10 to 20 times per second, producing a rattling noise.

As discussed above, the rattling phenomenon appears to be limited to the neutral mode of operation, i.e., when none of gears 19 are engaged. This observation is consistent with the foregoing analysis. More particularly, as hub splines 34 decelerate (FIG. 4B) while the vehicle is in gear, the end of shaft 24 is not unconstrained but, rather, transmits considerable torque through the transmission. This is analogous to applying an angular load to shaft 24 in the direction of arrow B. Consequently, shaft splines 30 remain loaded against hub splines 34 notwithstanding variations in engine speed.

Referring now to FIGS. 6-11, the mechanism for applying a controlled resistance to relative angular motion between the hub and shaft in accordance with a preferred embodiment of the invention will now be described. With specific reference to FIG. 6, relative angular motion is reduced in prior art systems by applying a seating torque to nut 104, thereby pinching hub 22 between nut 104 and shoulder 23 of shaft 22. The applied torque urges nut 104 into contact with hub shoulder 108 along a line parallel to the common rotational axis of shaft 24 and hub 22, producing a bearing force at the planar junction between hub shoulder 108 and nut shoulder 106 and at the junction between shaft shoulder 23 and hub shoulder 25.

The coefficients of static friction between respective shoulders 106 and 108 and between respective shoulders 23 and 25, in conjunction with the above-described bearing forces, produce angular frictional forces acting in planes transverse (i.e., not parallel) to the shaft axis. Proper selection of the initial seating torque on nut 104 results in sufficient frictional force to counteract the forces associated with the high frequency variations in engine speed at idle. That is to say, the frictional forces due to the initially applied seating torque adequately inhibit relative angular motion between nut 104 and hub 22. By reducing such relative angular motion, rattle may be inhibited.

Returning now to FIGS. 7-11, the present inventor has determined that maintaining a satisfactory resistance to relative angular motion between the shaft and hub over time involves interruption of the mechanical circuit at the nut/hub junction so that the frictional force associated therewith is not influenced by the seating torque applied to nut 104.

Figure 11:
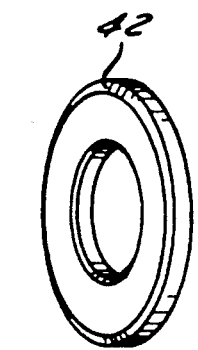
FIG. 11 is a perspective view of the shoulder washer shown in FIGS. 7 and 8.

In accordance with a preferred embodiment of the present invention, shoulder washer 42 is disposed about shaft 24 and retained between a retaining nut 40 and shaft shoulder 54, which shoulder is illustratively defined by the terminations of shaft splines 30. Shoulder washer 42 is suitably retained between nut 40 and shoulder 54 by a predetermined seating torque applied to nut 40 during assembly thereof. As best seen in FIG. 11, washer 42 may be any suitable washer having an inner diameter large enough to conveniently slip past respective threads 46 on shaft 30 during assembly.

Figure 10:
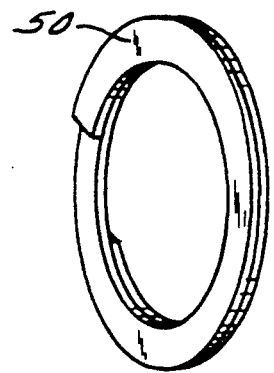
FIG. 10 is a perspective view of the retaining clip shown in FIGS. 7 and 8.

A disc spring 48, for example a Bellville spring, is disposed within hub 22 adjacent washer 42 and held in place by a retaining clip 50. Clip 50 is suitably retained within a circular groove 52 in hub 22. As best seen in FIG. 10, clip 50 illustratively comprises a thin, flat continuous strand of material, traversing an arc of approximately 700°. Those skilled in the art will appreciate, however, that any convenient means may be employed to retain spring 48 in place, for example a snap ring.

Figure 9A:
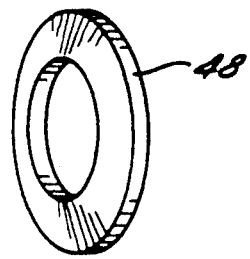
FIGS. 9A-9C are perspective, top, and side views, respectively, of the disc spring shown in FIGS. 7 and 8.
Figure 9B:
Figure 9C:
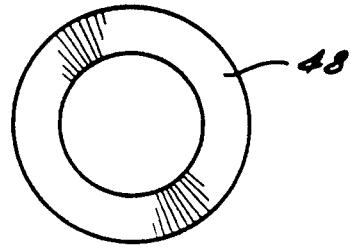
Figure 7:
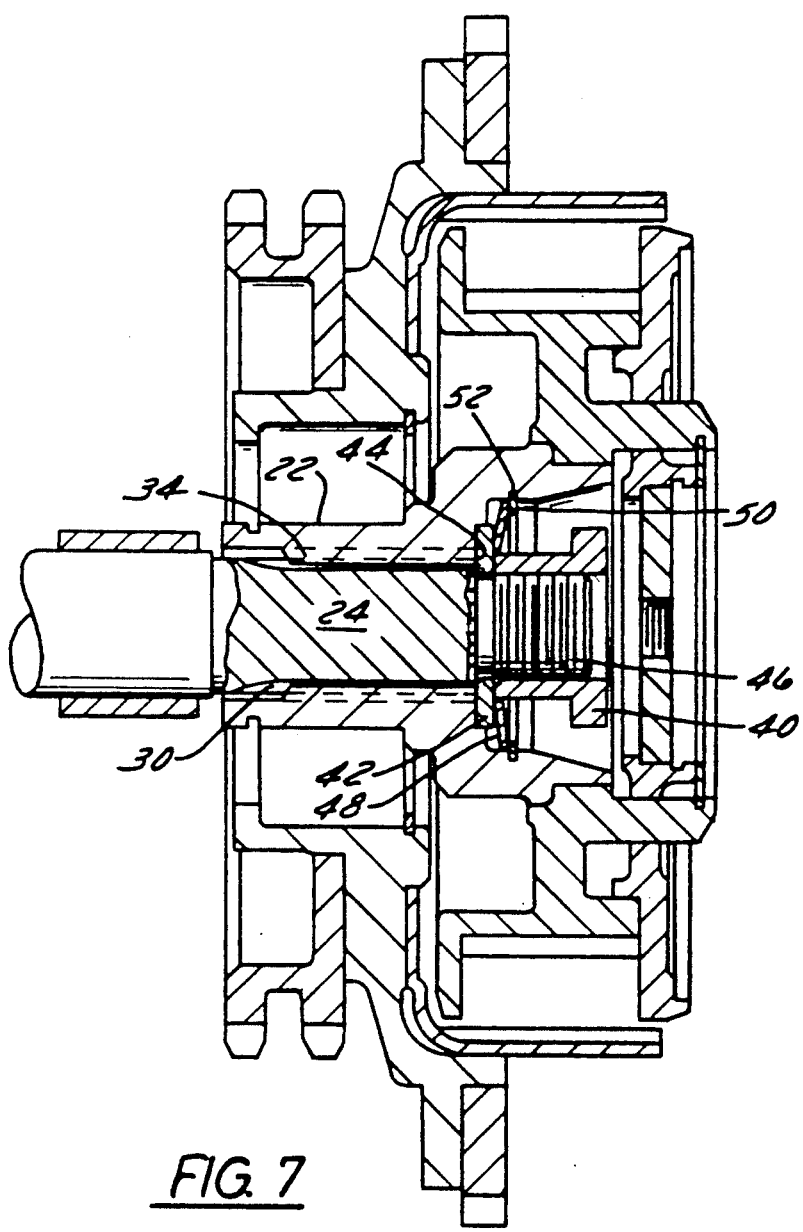
FIG. 7 is a cross section view of a controlled friction retaining mechanism in accordance with one aspect of the present invention, shown in cooperative association with a shaft and a hub.

As seen in FIGS. 9A-C, spring 48 beneficially comprises a generally frustoconical, resiliently deformable annular spring. Proper selection of the dimensions and relative disposition of washer 42, spring 48, and clip 50 yields a predetermined spring force applied by spring 48 to washer 42. Moreover, spring 48 may be selected such that it applies an essentially constant spring force to washer 42 throughout a predetermined range of compression of spring 48 In this way, consistent frictional control over the shaft/hub assembly may be maintained from vehicle to vehicle notwithstanding dimensional variations in the various components parts.

Figure 8:
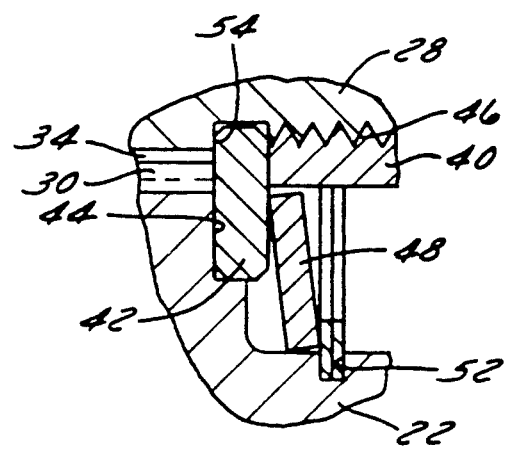
FIG. 8 is an enlarged view of a portion of the retaining mechanism of FIG. 7.

With particular reference to FIG. 8, washer 42 abuts a shoulder 44 of hub 22, such that washer 42 is pinched between shoulder 44 and spring 48 much like a bicycle wheel is pinched by brake calipers This caliper-like action creates a predetermined frictional force between washer 42 and each of spring 48 and shoulder 44.

The torque capacity (slip torque) of the assembly comprising washer 42, nut 40, and shaft shoulder 54 is defined by the amount of torque, applied to shaft 24, required to cause slippage at the interface between shoulder 54 and washer 42. Similarly, the torque capacity of the assembly comprising spring 48, hub shoulder 44, and washer 42 is defined by the amount of torque applied to shaft 24 required to cause slippage between washer 42 and hub shoulder 44 or between washer 42 and spring 48. The present inventor has determined that by maintaining the torque capacity of the assembly comprising nut 40, washer 42, and shoulder 54 higher than the torque capacity of the assembly comprising spring 48, hub shoulder 44 and washer 42 by a factor of approximately 2 or more, slippage at the junction between washer 42 and shaft shoulder 54 may be eliminated. As a result, the initial seating torque applied to nut 40 remains unchanged over time notwithstanding the application of acceleration reversals to shaft 24.

In a preferred exemplary embodiment, the force exerted by spring 48 on washer 42 should be selected to produce a combined resistance to torque at the contact regions between washer 42 and each of spring 48 and shoulder 44 in the range of about 5-50 foot pounds, and preferably about 10-15 foot pounds.

In any event, the spring force should be selected to yield a torque capacity at the caliper mechanism (spring 48, hub shoulder 44, and washer 42) which is less than the torque capacity exhibited by nut 40, shaft shoulder 54, and washer 42 by a comfortable margin (e.g , 1:2 or 1:3).

As discussed above, acceleration reversals associated with vehicle speed changes (i.e., not at idle) are often of significantly greater magnitude than those due to engine speed oscillations at idle. The phenomenon observed in prior art retaining mechanisms, namely the reduction of frictional control provided by the retaining nut, is overcome in accordance with one aspect of the present invention inasmuch as the mechanical circuit comprising the retaining nut shoulder and hub shoulder is interrupted. Accordingly, for differential angular accelerations between shaft 24 and hub 22 which exceed the capacity of spring 48 to inhibit relative angular motion between shaft 24 and hub 22, slippage occurs at the junction between washer 42 and shoulder 44 and at the junction between spring 48 and either or both of washer 42 and clip 50 (and possibly at the junction between clip 50 and groove 52 as well). As a result, the interface between nut 40 and threads 46 of shaft 24 remains substantially isolated from the foregoing dynamics It will be understood that the above description is of preferred exemplary embodiments of the present invention, and that the invention is not limited to the specific forms shown. For example, although the controlled friction retaining mechanism was described in the context of a motorcycle clutch, it is understood that the present invention has broad applicability in power transmission systems in which it is desirable to controllably inhibit relative motion between a hub and a shaft circumscribed thereby. Moreover, various other substitutions, modifications, changes and omissions may be made in the design and arrangement of the elements without departing from the spirit of the invention as expressed in the appended claims.

I claim:

1. An apparatus for controlling relative angular motion between a hub and a shaft configured for rotation therewith, comprising:
   a hub having a bore extending therethrough and a first surface disposed transverse to the axis of said bore;
   a shaft journalled through said bore and having a first end disposed proximate said first surface of said bore;
   friction means, secured to said shaft proximate said first end, for frictionally engaging a portion of said first surface; and
   control means, cooperating with said hub and said shaft, for applying a predetermined amount of force to said friction means to thereby inhibit relative angular motion between said shaft and said hub, said control means being configured to be free of contact with said portion of said first surface which is engaged by said friction means.

2. The apparatus of claim 1, further comprising a clutch mechanism including clutch means for intermittently engaging said hub for driving rotation therewith.

3. The apparatus of claim 2 wherein said hub further includes drive means for rotably driving said shaft.

4. The apparatus of claim 1, further comprising a washer circumscribed about said shaft and wherein said friction means comprises a second surface of said washer disposed transverse to said axis of said bore.

5. The apparatus of claim 1 wherein said first and second surfaces are substantially parallel to each other and suitably perpendicular to said axis of said bore.

6. An apparatus for controlling the engagement between a rotating hub and a shaft configured for rotation therewith, comprising:
   a hub having an axial bore extending therethrough and having a first bearing surface and a first control surface associated therewith;
   a shaft configured for receipt within said bore and having a second bearing surface and a second control surface associated therewith;
   control means, contacting said first control surface and said second control surface, for resiliently biasing said first bearing surface into frictional engagement with said second bearing surface.

7. The apparatus of claim 6 wherein said control means comprises a resiliently deformable spring.

8. The apparatus of claim 6, wherein said control means comprises a Bellville washer.

9. The apparatus of claim 6, wherein:
   said first bearing surface comprises a first shoulder formed integrally with said hub;
   said shaft includes a first annular ring extending radially therefrom; and
   said second control surface comprises a first surface of said first annular ring.

10. The apparatus of claim 9, wherein said second bearing surface comprises a second surface of said first annular ring.

11. The apparatus of claim 9 wherein said hub further comprises a second annular ring rigidly affixed thereto, and said first control surface comprises a first surface of said second annular ring.

12. The apparatus of claim 11 wherein said control means is disposed intermediate said first and said second annular rings.

13. The apparatus of claim 6 wherein:
   said shaft further comprises a first annular ring secured thereto by a nut threadedly attached to an end of said shaft;
   said second control surface comprises a first surface of said first annular ring;
   said second bearing surface comprises a second surface of said first annular ring opposing said first surface of said first annular ring;
   said hub comprises a second annular ring, a first surface of which comprises said first control surface; and
   said control means comprises a spring washer disposed intermediate said first and second annular rings.

14. An apparatus for controlling relative angular motion between a shaft and a hub configured for rotation with said shaft, the apparatus comprising:
   a hub including an axial bore extending therethrough and having a first bearing surface associated therewith;
   a shaft journalled through said axial bore and having a second bearing surface associated therewith;
   a resiliently deformable control mechanism, cooperating with said shaft and said hub, said control mechanism being configured to bias said first bearing surface into frictional engagement with said second bearing surface to thereby control the relative angular motion of said shaft with respect to said hub.

15. The apparatus of claim 14, wherein:
said hub further comprises a first control surface;
said shaft further comprises a second control surface; and
said control mechanism circumscribes said shaft and frictionally engages each of said first and said second control surfaces.

16. The apparatus of claim 15, wherein:
said shaft further comprises a first annular ring secured thereto by a nut threadedly engaging an end of said shaft;
said second bearing surface comprises a first surface of said first annular ring;
said second control surface comprises a second surface of said first annular ring;
at least one of said first bearing surface and said first control surface comprises an annular shoulder formed in said hub; and
said control mechanism contacts each of said first and said second control surfaces and biases said first control surface away from said second control surface.

17. The apparatus of claim 14, wherein:
said axial bore comprises a splined inner surface, said bore terminating at said first bearing surface;
said shaft comprises a splined outer surface drivingly engaging said splined inner surface, said splined outer surface terminating at a shaft shoulder.

18. The apparatus of claim 17, wherein said shaft further comprises:
an annular disc having opposing first and second surfaces; and
means for securing said annular disc to said shaft such that a portion of said first surface of said annular disc abuts said shaft shoulder;
wherein said shaft, said annular disc, and said securing means comprise a rigid, unitary assembly.

19. The apparatus of claim 18, wherein:
said hub further comprises a retaining clip secured therein;
said control mechanism comprises a spring washer circumscribing said shaft and disposed intermediate and in contact with said retaining clip and said second surface of said annular disc; and
said spring washer is configured to bias said annular disc to effect frictional engagement between said first bearing surface and said first surface of said annular disc with a frictional force determined as a function of the spring rate of said spring washer.

20. The apparatus of claim 18 wherein said second bearing surface comprises a portion of said first surface of said annular disc.

* * * * *